United States Patent [19]

Williams et al.

[11] Patent Number: 5,265,487
[45] Date of Patent: Nov. 30, 1993

[54] APPARATUS FOR INDEXING A RACK AND PINION MECHANISM

[75] Inventors: Jeffrey R. Williams, Livonia; John C. Singer, III, Plymouth, both of Mich.

[73] Assignee: Ford Motor Company, Dearborn, Mich.

[21] Appl. No.: 940,136

[22] Filed: Sep. 3, 1992

[51] Int. Cl.$^5$ .................... F16H 1/04; B60R 25/02
[52] U.S. Cl. ........................ 74/422; 29/893.1; 70/252; 74/109; 200/61.54
[58] Field of Search ............ 74/109, 422; 70/184, 70/185, 186, 252; 200/11 C, 43.08, 61.54, 501; 29/893.1, 464

[56] References Cited

U.S. PATENT DOCUMENTS

| | | | |
|---|---|---|---|
| 2,376,161 | 5/1945 | Maud et al. | 74/422 |
| 2,410,643 | 11/1946 | Fielding | 74/422 |
| 2,448,200 | 8/1948 | Walter | 74/422 X |
| 2,771,782 | 11/1956 | Darby | 74/32 |
| 3,443,449 | 5/1969 | Kotarski | 74/422 |
| 3,490,255 | 1/1970 | Wight et al. | 70/252 |
| 3,589,205 | 6/1971 | Radovic | 74/422 |
| 3,638,462 | 2/1972 | White et al. | 70/252 X |
| 3,648,490 | 3/1972 | Kimberlin et al. | 70/186 |
| 3,703,092 | 11/1972 | Elliott | 70/252 X |
| 4,487,111 | 12/1984 | Prince | 92/110 |
| 4,916,971 | 4/1990 | Haldric et al. | 74/552 |

Primary Examiner—Leslie A. Braun
Assistant Examiner—David W. Laub
Attorney, Agent, or Firm—Raymond L. Coppiellie; Roger L. May

[57] ABSTRACT

A rack and pinion mechanism in a switch apparatus which ensures proper staging of the pinion to the rack during assembly is disclosed. A protuberance engages a receiver disposed on the rack and operates to prevent final assembly of the pinion to the rack unless both are properly staged. This minimizes the occurrence of misstaged switches assembled in blind installation conditions.

18 Claims, 4 Drawing Sheets

APPARATUS FOR INDEXING A RACK AND PINION MECHANISM

BACKGROUND OF THE INVENTION

1. Field of the Invention

This invention relates to rack and pinion gear devices. More specifically, the present invention relates to an apparatus for properly indexing the pinion to the rack during assembly.

2. Disclosure Information

Rack and pinion devices are commonly used to transform rotations of a pinion into translations of a rack. Electrical switches and mechanical selectors frequently employ a rack and pinion device. Commonly, operators use switch devices to select a single function from several optional functions. An example of such an application is a climate control system operated through a rotary switch as found in motor vehicles. The operator selects an operating mode, such as "vent" from several options, such as floor, defrost, air conditioning, etc., by rotating the dial to the desired function. Another common motor vehicle application is the ignition key switch.

A problem in assembling switches employing rack and pinion devices is properly aligning the pinion to the rack. Alignment is difficult because the rack and pinion are meshed in a "blind spot," meaning that it is difficult to visually inspect the meshing. If the rack and pinion are not meshed properly during assembly, when the operator makes a selection, the desired function may not be activated. For example, when the ignition key is rotated to the "LOCK" position, the switch may actually engage the "ACCESSORY" position. When the apparatus is assembled in this condition, the switch is "misstaged." Preventing misstaging requires meticulous alignment during assembly, a time and labor intensive procedure. Ultimately, misstaging can result in a dissatisfied customer and increased warranty costs associated with removal and realignment of the switch.

Various devices have been proposed for indexing a rack and pinion. For example, U.S. Pat. No. 2,410,643 discloses a rack and pinion mechanism that provides self alignment for longitudinally engaging mechanisms. Longitudinal engagement occurs when the relative motion between the rack and pinion is on the longitudinal axis of the rack. This is not helpful, however, when the rack and pinion are engaged laterally, particularly in a blind spot. Lateral engagement occurs when the relative motion between the rack and pinion occurs generally perpendicularly to the longitudinal axis of the rack.

It would be desirable to provide an apparatus that would ensure accurate staging of a rack and pinion mechanism in which the pinion laterally engages the rack in a blind spot. It would be further desirable to provide a device that prevents a switch assembly from being assembled in a misstaged condition.

SUMMARY OF THE INVENTION

The present invention provides a solution to misstaging a rack and pinion mechanism. In accordance with the present invention, there is disclosed a switch apparatus comprising an elongate rack having a plurality of rack teeth disposed thereon, the rack is axially reciprocal. Additionally, the switch apparatus has a pinion adapted to matingly engage the rack. The switch apparatus further comprises a mechanism for aligning the pinion relative to the rack along an axis generally Parallel to the axis of the rack teeth. The switch apparatus also comprises a mechanism for preventing misstaging of the pinion relative to the rack.

One advantage the present invention provides is consistent engagement of a rack and pinion switch apparatus assembled under blind assembly conditions. Other advantages of the present invention will become apparent to those skilled in the art from the drawings, detailed description and claims which follow.

DETAILED DESCRIPTION OF THE PREFERRED EMBODIMENTS

Figure 1:
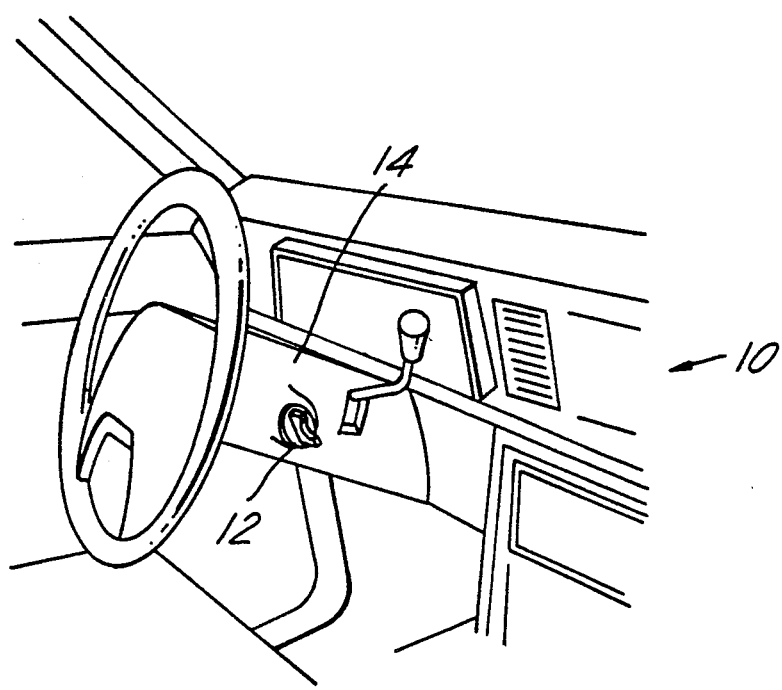
FIG. 1 is a perspective view of the interior of an automobile.
Figure 2:
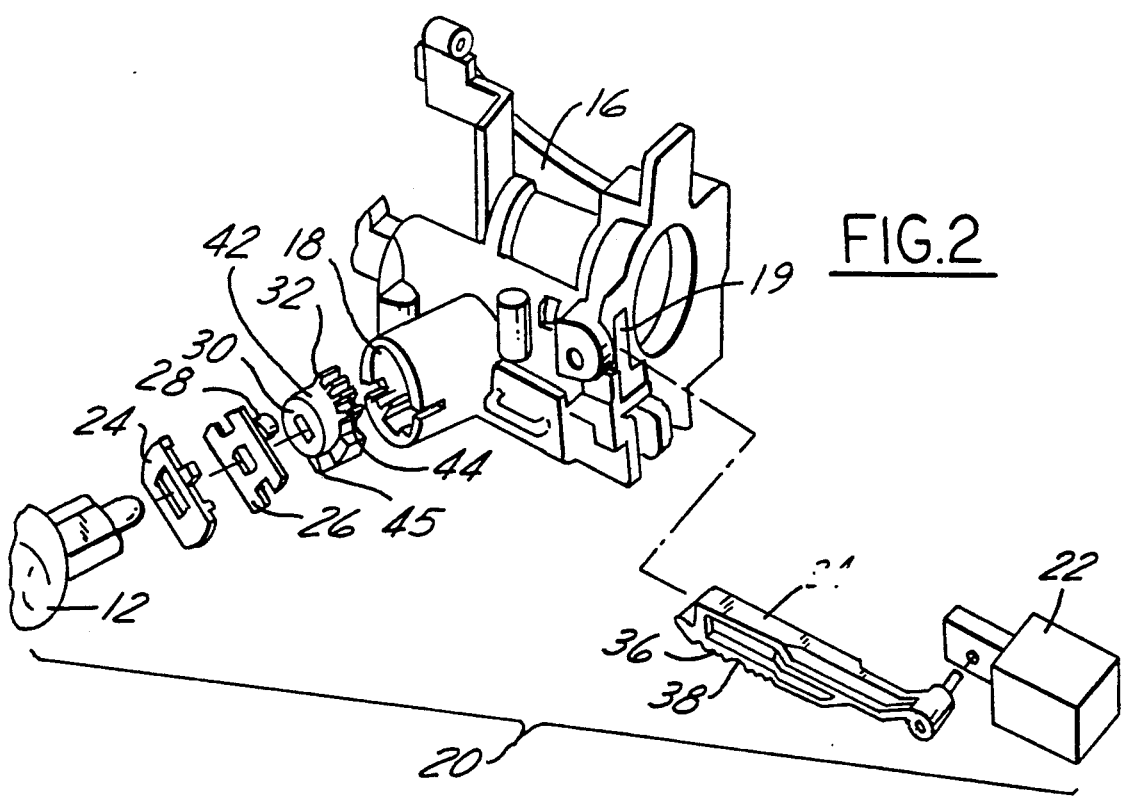
FIG. 2 is an exploded perspective view of a steering column mounted ignition switching assembly.

Referring now to the drawings, FIGS. 1 and 2 show a motor vehicle 10 having an ignition key cylinder 12 mounted to a steering column 14. Steering column 14 includes a steering column housing 16 having an integrally formed cylindrical bore 18 and a guide bore 19 for housing the ignition key cylinder 12. A switch apparatus 20, according to the present invention, operatively interconnects the ignition key cylinder 12 to an ignition switch block 22. It should be readily apparent to one skilled in the art that this invention applies equally to a broad range of devices employing rack and pinion mechanisms such as automotive climate control switches and automotive rack and pinion steering systems.

The switch apparatus 20 includes a retainer 24, a generally planar disk 26 having an axial protuberance 28, a pinion 30 having a plurality of pinion teeth 32 circumferentially disposed thereabout which meshingly engage a rack 34 through a plurality of rack teeth 36. During assembly, the protuberance 28 engages a notch 38 disposed on the rack 34 at a predetermined location.

Figure 3:
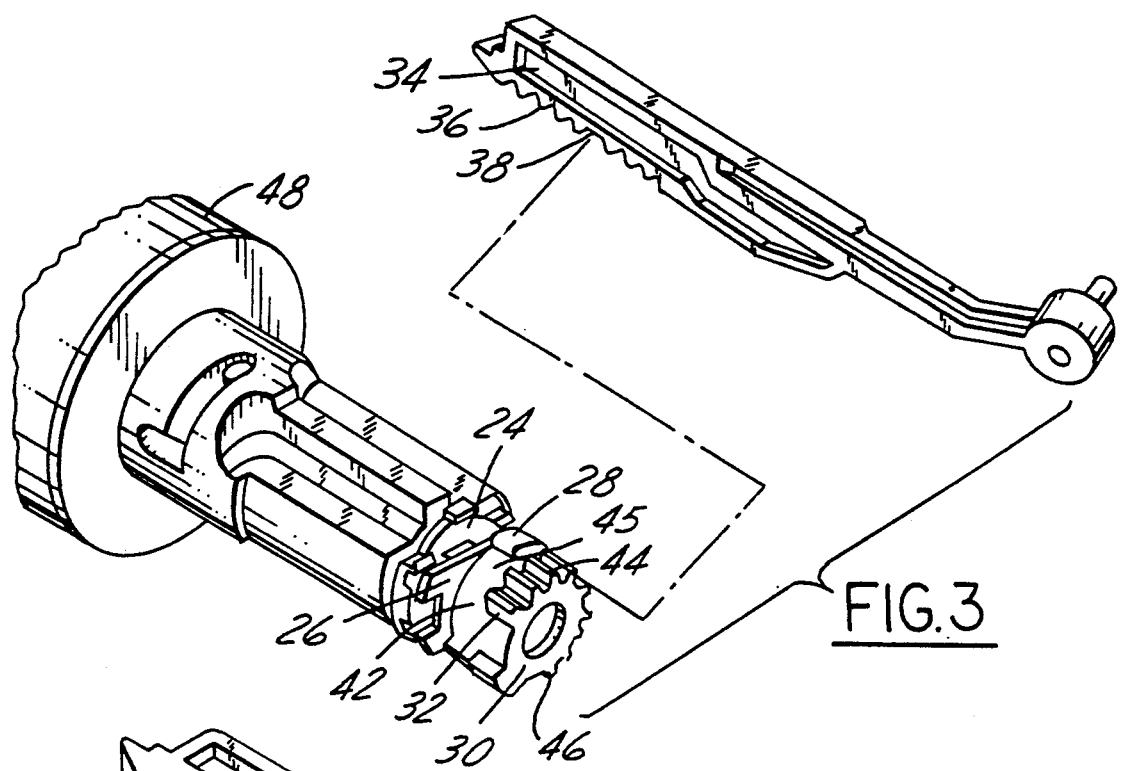
FIG. 3 is a perspective view of an installation tool assembly prepared for installation of the present invention.
Figure 6:
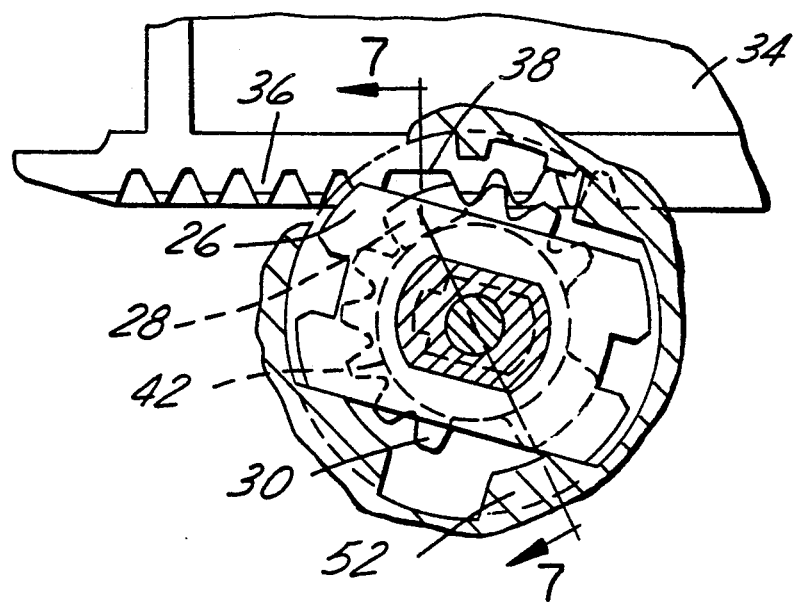
FIG. 6 is a cross-sectional view taken along line 6—6 of FIG. 5.

In one embodiment, as shown in FIGS. 2, 3 and 6, the protuberance 28 comprises an axial arcuate extension integrally cast with disk 26. The protuberance 28 fits onto the outer circumference 42 of the pinion 30, and circumferentially occupies the space of approximately two Pinion teeth 32. Additionally, the protuberance 28 has an axial length of approximately one half the axial length of the pinion 30. Although the disk 26 of the described embodiment is made utilizing sintered metal technology, the invention is not so limited. Alternative materials including, but not limited to, die cast metals, stamped steels and plastics would function equally well.

The pinion 30 includes a set of short pinion teeth 44 having an axial length of approximately one-half the axial length of the pinion 30. The short teeth 44 surround approximately 270 degrees of the pinion 30. A set of long pinion teeth 46 make up the remaining teeth of the pinion 30. The free space 45 provided by the set of short pinion teeth 44 accommodates the protuberance 28 during assembly and subsequent rotation of the pinion 30. The set of short pinion teeth 44 extend around the Pinion 30 for at least as many degrees as the switch 12 rotates in operation. The switch in the described embodiment rotates less than 270 degrees about the rotational axis of the switch.

Figure 4:
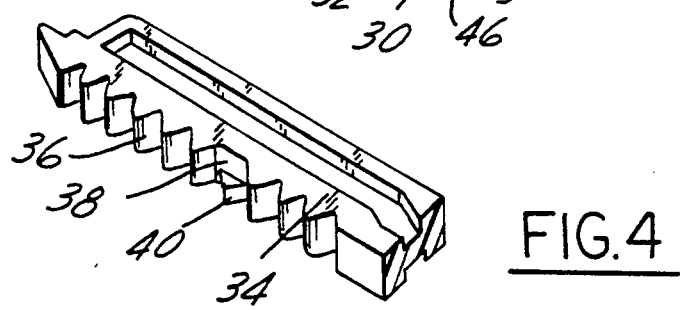
FIG. 4 is a perspective view of a rack gear according to the present invention.

In one embodiment, the distal end of rack 34 is connected to an ignition switch block 22 for activating the vehicle 10. Rack 34 includes the notch 38 comprising a single short rack tooth 40, as shown in FIGS. 4 and 6. The location of the notch 38 on rack 34 establishes the Positioning of properly staged rack 34. The notch 38 has a depth of approximately one half the length of a rack tooth 36. According to the present invention, the width of the notch 38 must closely match the mating width of the protuberance 28 to prevent misstaging. The specific notch of the described embodiment is only one example. For instance, the notch could be two teeth wide, or be a separate receiving hole located completely apart from the rack teeth. For instance, a hole disposed on the side of the rack 34 below the teeth 36. As with the pinion 30, the functionality of the present invention is not dependent on the process of manufacture or the material chosen for the rack 34. For example a sturdy plastic will work as well as a die cast or stamped rack.

An assembly tool 48, shown in FIG. 3, simultaneously aligns and installs the retainer 24, disk 26 and pinion 30 in cylindrical bore 18 of the steering column housing 16. With the rack 34 positioned in the guide bore 19, the tool 48 aligns and inserts the components in the bore 18. The tool 48 and cylindrical bore 18 are matingly keyed for positive alignment. Similarly, the retainer 24, disk 26, and pinion 30 are individually keyed to the tool 48 providing proper orientation within the cylindrical bore 18.

Figure 5:
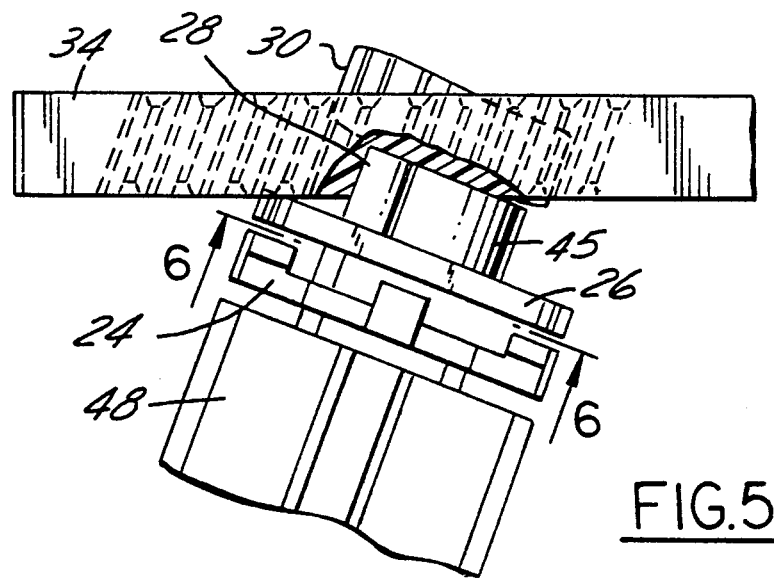
FIG. 5 is a top view of the installation tool fully inserted in the cylindrical bore in accordance of the present invention.
Figure 7:
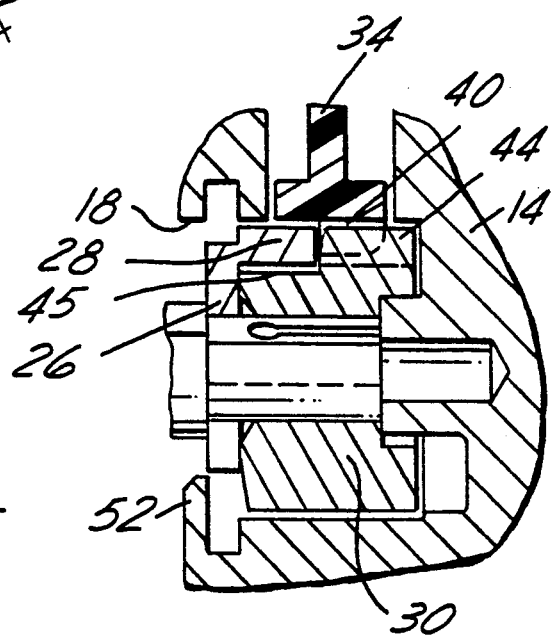
FIG. 7 is a cross-sectional view taken along line 7—7 of FIG. 6.
Figure 8:
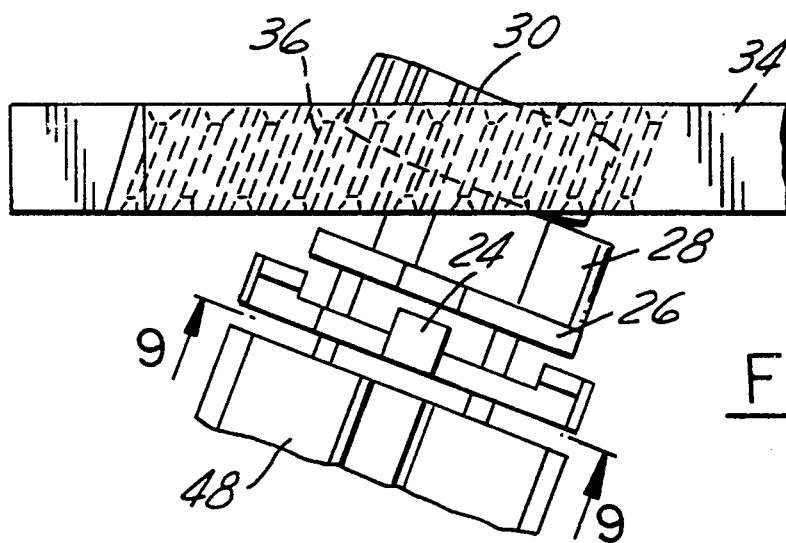
FIG. 8 is a top plan view of the installation tool and switch apparatus components in the rotated position in accordance with the principles of the present invention.
Figure 9:
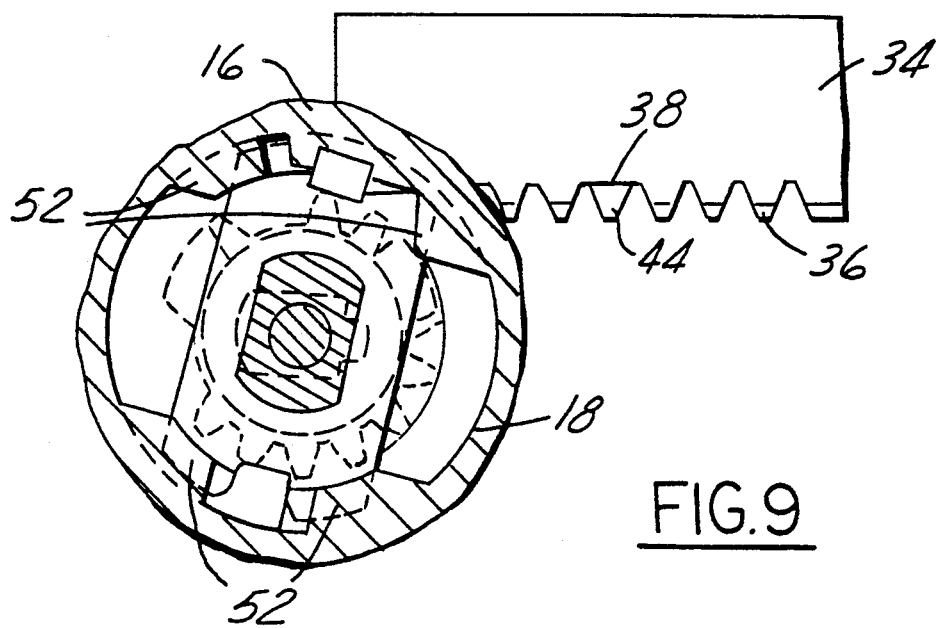
FIG. 9 is a cross-sectional view taken along line 9—9 of FIG. 8.

As the assembly tool 48 positions the pinion 30 in engagement with rack 34, the protuberance 28 simultaneously engages the notch 38. FIGS. 5-7 show the protuberance 28 and pinion 30 fully engaged with the rack 34. In this position, an operator rotates the tool 48, which in turn rotates the disk 26 and pinion 30 causing the retainer 24 to seat in the installed position, illustrated in FIGS. 8 and 9. This rotation causes the disk 26 to engage with the retention tabs 52 of the cylindrical bore 18 in the steering column housing 16. Simultaneously, the protuberance 28 rotates away from the rack 34 into a final installed position within the free space 45 on the pinion 30 that allows reciprocation of the rack 34.

However, when the assembly tool 48 is inserted in the cylindrical bore 18, if the rack 34 is not Properly staged, the protuberance 28 will not engage the notch 38. This will prevent complete insertion of the assembly tool in the bore 18. The retention tabs 52 will operatively interfere with the disk 26 to prevent tool 48 from rotating. Therefore, unless the protuberance 28 properly engages notch 38 in rack 34, the installation fails and misstaging is prevented.

It should be apparent that the described embodiment is not the only way of achieving the advantages of the present invention. As an example, an assembly tool having a permanently attached protuberance for engaging a receiving hole on the rack would also provide the same function. Assembly of the rack and pinion would only result when the protuberance properly engaged the hole in the rack. Various other modifications are also apparent without departing from the spirit and scope of the present invention. It is the following claims, including all equivalents, which define the scope of the present invention.

What is claimed is:

1. A switch apparatus for use in a motor vehicle, comprising:
   an elongate rack having a plurality of rack teeth disposed thereon, said rack being axially reciprocal;
   a pinion adapted to matingly engage said rack;
   bore means for aligning said pinion relative to said rack along an axis generally perpendicular to the elongated rack in its direction of reciprocation; and
   means for preventing misstaging of said pinion relative to said rack.

2. A switch apparatus according to claim 1, wherein said means for preventing misstaging comprises a member engageable with said rack to secure said rack in a predetermined position during assembly of said apparatus.

3. A switch apparatus according to claim 2, wherein said member comprises a generally planar disk having a protuberance engageable with said rack.

4. A switch apparatus according to claim 2, wherein said rack includes a notch adapted to receive said member.

5. A switch apparatus according to claim 3, wherein said rack includes a notch disposed at a predetermined position in said plurality of rack teeth adapted to receive said protuberance.

6. An ignition switch apparatus disposed in a motor vehicle steering column housing, said apparatus. adapted to receive an ignition key for activating a function of said vehicle upon rotation of said key, said apparatus comprising:
   an elongate rack disposed within a rack guide and having a plurality of rack teeth disposed thereon, said rack being axially reciprocal in response to rotation of said key and being connected to an ignition switch block such that axial reciprocation of said rack in a predetermined direction activates said function of said vehicle;
   a pinion adapted to matingly engage said rack;
   means for aligning said pinion relative to said rack along an axis generally parallel to the axis of said plurality of rack teeth; and
   means for preventing misstaging of said pinion relative to said rack.

7. A switch apparatus according to claim 6, wherein said means for aligning comprises a cylindrical bore integral of said steering column housing with an axis generally parallel to the axis of said Plurality of rack teeth.

8. A switch apparatus according to claim 6, wherein said means for preventing misstaging comprises a generally planar bearing member, said bearing member having a protuberance engageable with said rack.

9. A switch apparatus according to claim 7, wherein said rack includes a notch disposed at a predetermined position in said plurality of rack teeth adapted to receive said protuberance.

10. A switch apparatus according to claim 8, wherein said notch depth is approximately one-half of said first rack teeth length.

11. A switch apparatus according to claim 3, wherein said pinion comprises a generally cylindrical member having a plurality of pinion teeth disposed on an outer circumference thereof.

12. A switch apparatus according to claim 6, wherein said pinion further includes a short set of pinion teeth and a set of long pinion teeth, said set of short pinion teeth surrounding at least one-half of said outer circumference of said pinion.

13. A switch apparatus according to claim 12, wherein said second set of pinion teeth extend approximately 270 degrees around said outer circumference of said pinion.

14. A switch apparatus according to claim 7, wherein said protuberance of said bearing is adapted to be positioned coincident said notch in said plurality of rack teeth during assembly of said switch apparatus to prevent misstaging of said rack relative to said ignition switch block.

15. A switch apparatus according to claim 7, wherein said protuberance is operative to rest adjacent said second set of pinion teeth after assembly of said switch apparatus to prevent interference of said protuberance with said rack and said pinion.

16. A switch apparatus according to claim 6, wherein said protuberance is further operative to limit the axial reciprocation of said rack relative to said rack guide.

17. A switch apparatus according to claim 6, further including a retainer operative to lock said bearing and said pinion in mating engagement with said rack.

18. An ignition switch apparatus disposed in a cylinder bore of a motor vehicle steering column housing, said apparatus adapted to receive an ignition key for activating a function of said vehicle upon rotation of said key, said apparatus comprising:

an elongate rack disposed within a rack guide and having a plurality of teeth disposed thereon, with a notch disposed at a predetermined position in said plurality of rack teeth, said rack being axially reciprocal in response to rotation of said key and being connected to an ignition switch block such that axial reciprocation of said rack in a predetermined direction activates said function of said vehicle;

a pinion adapted to matingly engage said rack, said pinion comprising a generally cylindrical member having a predetermined width having a short set of pinion teeth having a length of approximately one-half the width of said pinion, said set of short pinion teeth extending approximately 270 degrees around the circumference of said pinion;

a cylindrical bore integral of said steering column housing with an axis generally parallel to the axis of said plurality of rack teeth said bore operative to align said pinion relative to said rack during assembly;

a generally planar bearing member, said bearing member operative to prevent misstaging of said pinion relative to said rack, said bearing member having a protuberance adapted to engage said rack coincident said notch during assembly and said protuberance is further operative to limit axial reciprocation of said rack relative to said rack guide after assembly of said apparatus; and a retainer operative to lock said bearing, said pinion and said rack in mating engagement in said cylinder bore.

* * * * *